F. SAXON.
AUTOMOBILE BODY.
APPLICATION FILED FEB. 20, 1912.
1,059,220.
Patented Apr. 15, 1913.
2 SHEETS—SHEET 2.
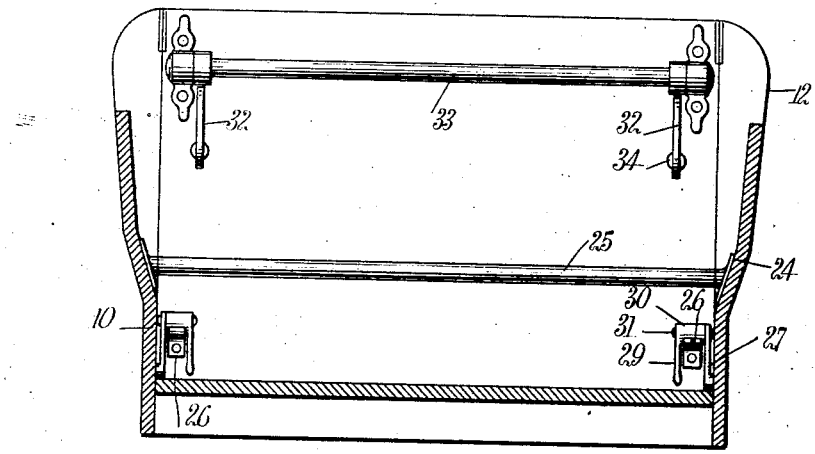
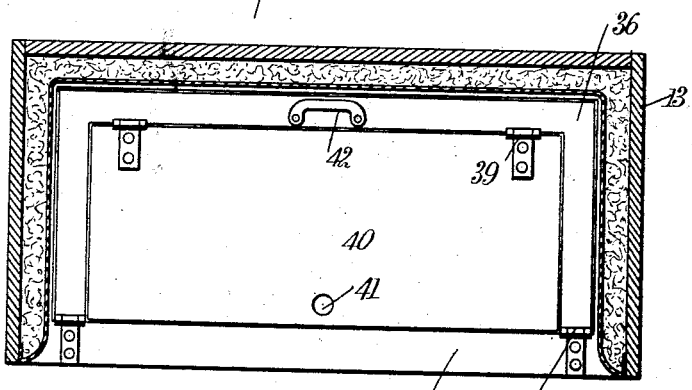
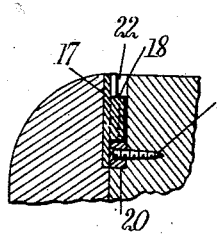
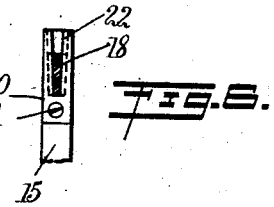
WITNESSES
INVENTOR
Frank Saxon
BY
ATTORNEYS

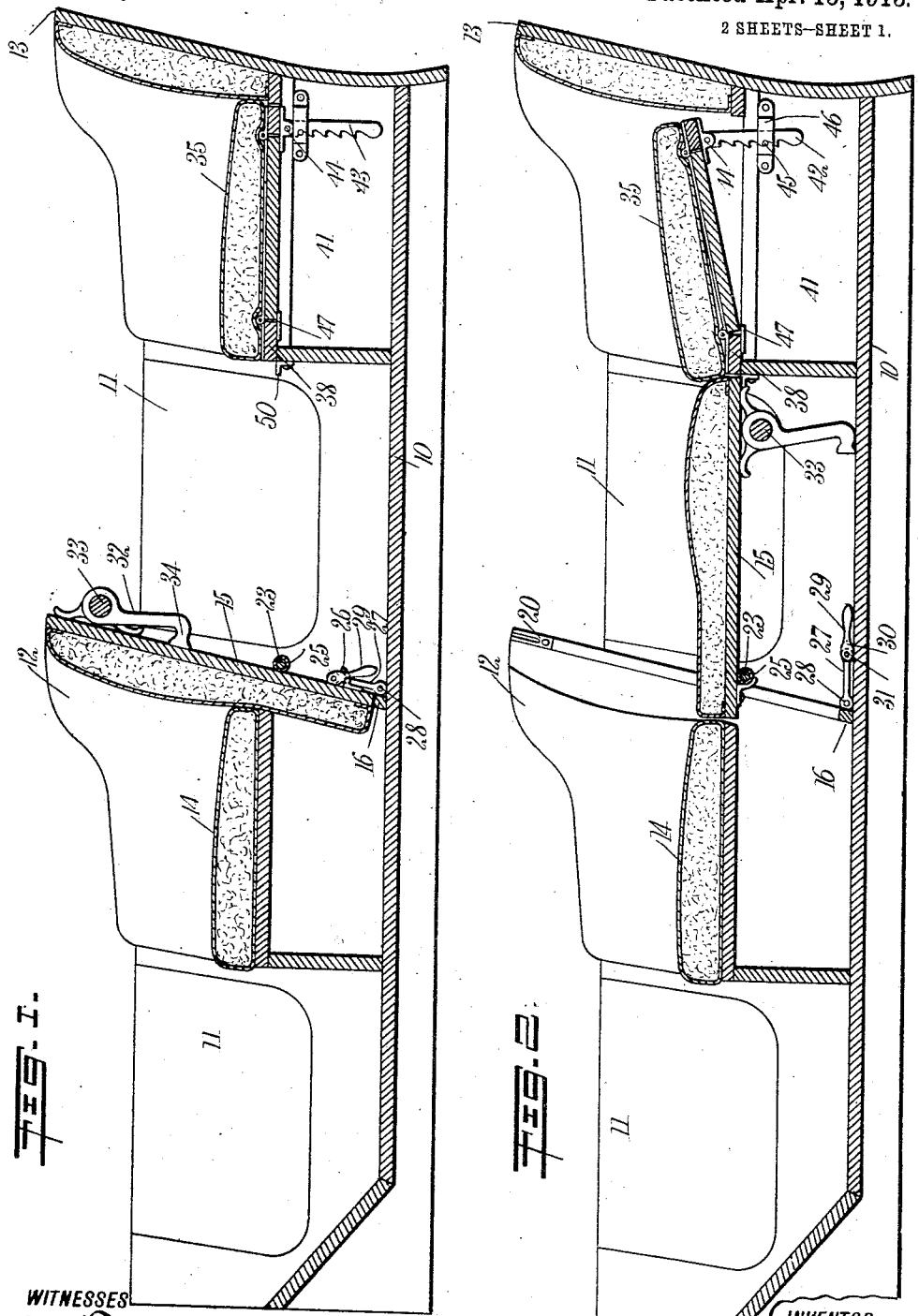

UNITED STATES PATENT OFFICE.

FRANK SAXON, OF HOUSTON HEIGHTS, TEXAS.

AUTOMOBILE-BODY.

1,059,220.  Specification of Letters Patent.  Patented Apr. 15, 1913.

Application filed February 20, 1912. Serial No. 678,759.

*To all whom it may concern:*

Be it known that I, FRANK SAXON, a citizen of the United States, and a resident of Houston Heights, in the county of Harris and State of Texas, have invented a new and Improved Automobile-Body, of which the following is a full, clear, and exact description.

The invention relates particularly to the seat portions of automobile bodies, and is designed to provide accommodations for those who desire to indulge in camping, touring, hunting and out-door life in general.

In general appearance the exterior of the body is not changed by my invention from the standard designs of regular touring cars, but provision is made for converting the seats into a couch or bed by providing an improved arrangement of a lazy-back to a forward seat, to adapt it to assume a horizontal position between a forward and rear seat cushion to form a couch. Proper support for the lazy-back is provided both in its normal position and in the horizontal position.

The illustrated example of my invention is designed for that form of touring car in which there is a large space between the front and rear seats, and the lazy-back is given such vertical dimensions as to extend preferably to the floor of the car to receive direct support therefrom, or to contact with a strip on the car floor. The back when thus formed will be adapted to extend, when horizontal, over the free space between the front and rear seat cushions. Support is provided also for the upper end of the lazy-back, and desirably, this is effected by providing interengaging members respectively on the opposed side edges of the lazy-back and rear members of the fixed seat parts. There is furthermore provided an intermediate support which is at the rear of the lazy-back when the latter is in its normal position, and over and upon which the said lazy-back is rocked to a horizontal position to bring its lower end above the said intermediate support, to rest on the latter. The rear seat portion which co-acts with the front seat cushion and the convertible lazy-back, is mounted to be tilted to constitute a headrest and obviate the necessity of carrying pillows in the car, the tilting adjustment of the said rear seat being provided for while preserving a hinged member in the seat, which as usual, constitutes a lifting cover for the hamper beneath the seat.

Various other distinguishing features characterizing my improved construction will appear from the more specific description hereinafter to be given in connection with the structural embodiment of my invention illustrated as an example.

Reference is to be had to the accompanying drawings forming a part of this specification, in which similar characters of reference indicate corresponding parts in all the figures.

Figure 1 is a longitudinal section of an automobile body embodying my invention, the lazy-back of the front seat being in the normal position; Fig. 2 is a similar view showing the seat portions arranged to constitute a couch; Fig. 3 is a cross sectional view between the seats and looking toward the front seat, the parts being adjusted as in Fig. 1; Fig. 4 is a sectional plan view of the rear seat; Fig. 5 is a transverse vertical section showing one form of the upper support providing a connection between opposed edges of the lazy-back and a fixed seat part; and Fig. 6 is a detail view taken at right angles to Fig. 5.

The body 10 may be of conventional design, with doors as 11 of any approved arrangement, there being as usual, in touring cars, a front seat 12 and a rear seat 13. The seat portion 14 of the front seat is fixed and the lazy-back 15 thereof is separately formed to assume the normal position approximately upright at the back of the seat portion 14, as in Figs. 1 and 3, or the horizontal position as in Fig. 2. The vertical dimensions of the back 15 depend on the make of the car; in many makes there is a space between the front and back seats 12, 13, so short that a lazy-back extending at the lower edge approximately to the fixed portion 14, will equal the length of the space between the front and rear seats. In many cases, however, the cars have a greater space between the front and rear seats, and in this instance the lazy-back is extended downward as in the illustrated example, to receive support either directly on the floor of the car, or on a cross strip 16, so that the lazy-back has a bottom support practically along the entire length of its lower edge.

A supporting means is provided at the top for the lazy-back, the detail form of which may vary as will be obvious. Preferably, the supporting means at the top takes the form illustrated more particularly in Figs. 5 and 6, in which interengaging members are provided on the opposed side edges respectively of the lazy-back and a fixed seat part; thus the side edge of a fixed seat part may be provided with a fitting 17, consisting of a plate suitably secured in place, and presenting a wedge-shaped member 18, the side edges of which flare upwardly, and which is undercut to give approximately a T-shape in cross section. On the opposed edge of the lazy-back a mating fitting 20 is secured, as by a screw 21, and presents an undercut groove 22 to receive the fitting 17. The lazy-back may be lifted outward and upward to disengage the described mating members when the back is to be brought to the horizontal position, and when again brought to the vertical position the seat is dropped into place to cause the said members to engage to constitute the upper support or lock for the back.

A suitable means is provided for affording support for the lazy back at a point adjacent to the fixed seat part, and said means may vary according to whether the lazy-back extends downward below the fixed seat part, or terminates approximately at the said seat part to conform with the design of the car. In the illustrated example I have shown one means for supporting the back adjacent to the fixed seat part and consisting of a horizontal rod 23 secured by its ends in brackets 24, and said rod may advantageously be provided with an elongated friction sleeve 25, ranging along the said lazy-back. The bar or equivalent means located at this point constitutes a brace for the lazy-back adjacent to the fixed seat part when the said back is in its normal position, as in Fig. 1.

To convert the seats into a couch, the lazy-back is lifted out of its upper supports and slid and turned on the intermediate support 24, 25, and brought to the horizontal position shown in Fig. 2, whereby the now forward end of the lazy-back will rest directly upon the said intermediate support, bearing in the illustrated example, directly on the friction roller 25. Below the rod 24 or its equivalent, lugs 26 are secured to the rear face of the back 15, and near the floor of the car links 27 are pivoted at their lower ends to the car body as at 28, the free ends of each of said links carrying a cam lever 29, the cam head 30 of which is secured as by a bolt or rivet 31 to the link 27, the arrangement being such that the swinging of the links 27 on their pivots 28 will throw the cam levers to a horizontal position to lie along the floor of the car, as in Fig. 2, or to an upward position to bring the cam levers over the lugs 26. In the upper position the rocking of the cam levers causes a cam action between the lugs and the levers, so as to draw the lazy-back down tightly against the bottom rest, as 16.

When it is desirable that the lazy-back have leg supports to sustain the back in the reclining position, then advantageously these legs 32 may be mounted to swing on the robe rail 33. Each leg 32 at the bottom is preferably bent forwardly to provide a foot 34, which rests on the car floor when the back is in the horizontal position and contacts by its forward end against the rear side of the back, as in Fig. 1, when the back is in the normal position.

It will be understood that the form and arrangement of the several described supports for the seat back may be varied in practice according to the design of the car and the tastes of the builders or owners, and the full complement of supports described may not be all used in any one car, since less than the whole number may reasonably be relied upon to provide the necessary support.

To co-act with the horizontally disposed back of the front seat, the seat portion of the rear seat 13 is so constructed that the cushion part 35 may be tilted upward to constitute a head rest. Thus, as seen in Figs. 1, 2 and 4, a horizontal frame 36 is provided, consisting of a rear member and forwardly extending side members, the forward ends of the latter being hinged as at 37, to the fixed front portion 38 of the rear seat, and within said frame there is hinged at its back edge, as at 39, a seat-board 40, forming the cover to the hamper 41 provided beneath the rear seat. The board 40 is provided with a finger hole 41 or its equivalent, whereby it may be lifted to swing on its rear hinges 39; on the other hand the frame 36 carrying the board 40 may be tilted upward on its front hinges 37 by grasping the strap 42, or hand-hold provided on the rear strip of the said frame 36. On the under side of the frame 36 at the rear, props are provided preferably consisting of rack bars 43 pivoted as at 44, each adapted to engage by one or the other of its teeth with a pin 45 on the keepers 46, which are secured within the hamper 41 at the sides. By lifting the seat-board 40, access can readily be had to the props 43 for tilting the frame 36 and its board 40 to the desired degree to elevate the cushion 35 constituting the head rest. The front end of the lift board 40 may have a rest to prevent it from dropping into the hamper, there being shown for the purpose in Figs. 1 and 2, a lug 47 secured to the fixed strip 38 of the rear seat. On the front of the supporting structure of the rear seat a bracket 50 may be provided as a rest for the rear end of the seat back 15 when the latter is in a horizontal position.

Having thus described my invention, I claim as new, and desire to secure by Letters Patent,—

1. A vehicle provided with a seat consisting of a seat proper and a back movable relatively to the seat proper to assume a horizontal position, the said back extending downward below the same, said vehicle being provided with a rest for the bottom of the back independently of the seat and rearward of the seat and back, and means for furnishing a support and lock for the said back at the upper end when in the raised position, said last mentioned means comprising mating members on the inner faces of the seat portion and on the side edges of the back, said mating members comprising vertically extending grooved elements and corresponding projecting elements fitting said grooved elements.

2. A vehicle provided with a seat consisting of a fixed seat proper, and a back movable relatively to the fixed seat from a raised position to a horizontal position, and co-acting means near the floor of the vehicle and on the lower end of the seat back respectively, for locking the seat in the raised position.

3. A vehicle provided with a seat comprising a seat proper, and a back extending from adjacent to the bottom of the vehicle upwardly above the seat proper and provided with locking means at the top and bottom, said back being movable vertically relatively to the seat and being rockable to bring its lower end adjacent to the seat and assume a position in line with said seat.

4. A vehicle provided with a seat comprising a seat proper, and a back extending adjacent to the bottom of the vehicle upwardly above the seat proper, the said back having upper and lower locking means for holding it in the raised position, and the back and vehicle having co-acting devices between the upper and lower locking means serving to support the seat in the horizontal position.

In testimony whereof I have signed my name to this specification in the presence of two subscribing witnesses.

FRANK SAXON.

Witnesses:
O. P. WOODBURN,
M. E. LAYNE.